Figure 4:
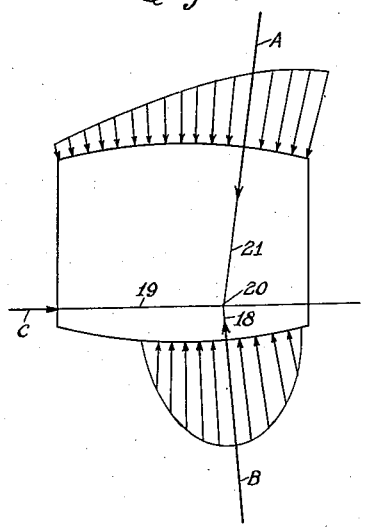

July 24, 1934.   O. W. AHMANSSON   1,967,650
ROLLER BEARING
Filed June 17, 1933   2 Sheets-Sheet 1
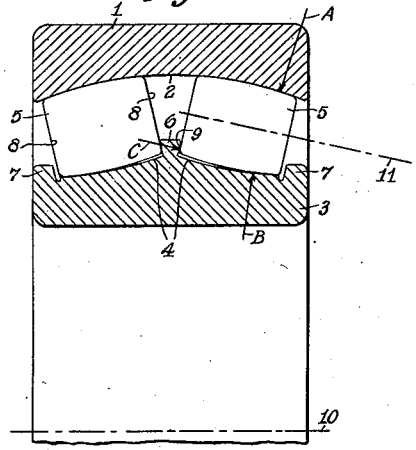
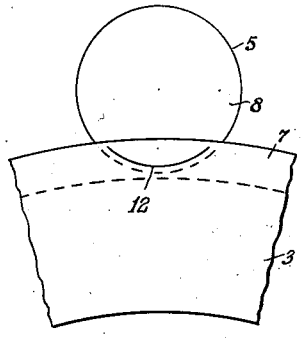
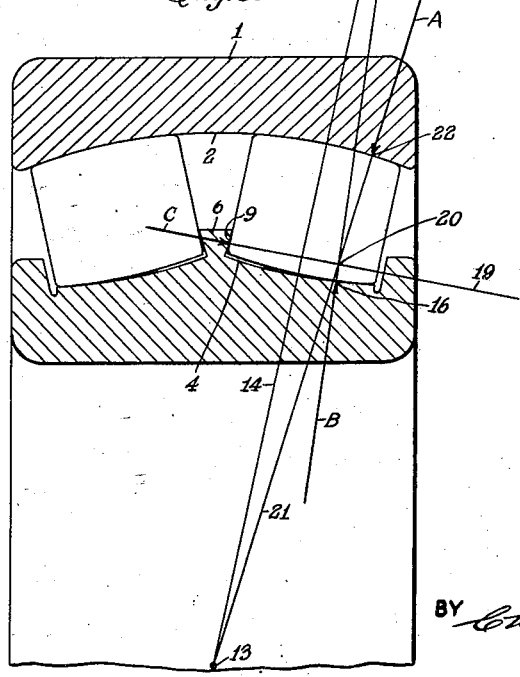
INVENTOR
OLOV WOOD AHMANSSON
BY
ATTORNEY

INVENTOR
OLOV WOOD ÅHMANSSON
BY
ATTORNEY

Patented July 24, 1934

1,967,650

UNITED STATES PATENT OFFICE 1,967,650

ROLLER BEARING

Olov Wood Åhmansson, Gottenborg, Sweden, assignor to Aktiebolaget Svenska Kullagerfabriken, Gottenborg, Sweden, a corporation of Sweden Application June 17, 1933, Serial No. 676,272
In Germany November 4, 1932

5 Claims. (Cl. 308—214)

The present invention relates to roller bearings, especially of self-aligning type, having one or more sets of symmetrical barrel-shaped rollers disposed between a race ring having a spherical race and a race ring having a nonspherical race, the said races being so formed and disposed relative to each other that the resultant of the forces acting in at least one of the contacts between a roller and the races is applied to the roller at one side of its greatest diameter, thereby pressing the roller against a pressure or guide flange on one of the race rings. According to a special form of the invention the end faces of the rollers are substantially plane and the contacting surface of the pressure or guide flange spherical, whereby the rollers will make contact with the flange along the arc of a circle disposed at or near the edge of the end surface of the roller.

According to a previously known form of self-aligning bearing the rollers are barrel-shaped and symmetrical but are guided between a pair of flanges, disposed one at each end of the rollers. In order to better guide the rollers, it has also been proposed to form the bearing in such a manner that the resultants of the forces acting upon the rollers at the race contacts give rise to a thrust directed along the axes of the rollers, which keeps them pressed against a pressure or guide flange. The rollers of this type of bearing are unsymmetrical, i. e. their greatest diameters are located nearer one end of the rollers than the other. Further, one of the end surfaces of the rollers is usually made convex and the other concave. One of the drawbacks of this type of bearing is, therefore, that the rollers must always be assembled in the bearing with the respective ends turned in a certain direction. The manufacture of the unsymmetrical rollers is also somewhat more complicated than that of the symmetrical rollers. In the bearing according to the present invention, on the other hand, the rollers may be turned in either direction since their rolling surfaces and end surfaces are symmetrical. This advantage is of considerable importance, when the bearings are dismantled for inspection and reassembled by more or less untrained workers. The bearing according to the present invention, therefore, combines the fool proof design and simplicity in manufacture of the bearing having symmetrical rollers with the superior roller guiding qualities of the roller bearing having unsymmetrical rollers.

Some forms of the invention are illustrated in the accompanying drawings, in which Fig. 1 shows a section through one half of a bearing having two sets of rollers, Figure 2 shows, on a somewhat larger scale, the contact between the end surface of a roller and the guide flange. Figure 3 shows the lines of action and points of application of the forces acting upon a roller of a form of bearing according to the invention, and Figures 4 to 7 show diagrams of the forces acting upon a roller in other forms of the invention.

The bearing shown in Figure 1 comprises an outer race ring 1 having a spherical race 2, an inner race ring 3 having two races 4 and two sets of symmetrical barrel-shaped rollers 5. The rollers engage the outer spherical race along the greater part of their length and the inner race at a point or along a short line located unsymmetrically with respect to the greatest diameter of the roller. The rollers are then subjected to forces, whose resultants A and B have a resultant acting inwardly toward the central plane of the bearing, so that the rollers will be pressed against a flange 6, disposed between the sets of rollers. The forces A and B will thus be balanced by a force C from the flange. The direction and points of application of these forces are discussed more fully in connection with Figure 3 in the following. Outside the roller sets are disposed flanges 7, which prevent the rollers from falling out of the bearing when it is not under load or when the outer race ring is swung out.

According to the forms of the invention shown, the ends 8 of the rollers are substantially plane and are preferably somewhat chamfered or rounded at the edges to avoid an injurious concentration of pressure at the edges. The flange 6 has spherical side faces 9. The centres of these spherical surfaces are preferably located at the points of intersection of the bearing axis 10 and the axes 11 of the rollers. In a bearing constructed in this manner the ends 8 of the rollers will engage the spherical side faces 9 along the arc of a circle 12, as shown in Figure 2. Since this arc has a comparatively great extension in the direction of rolling, the rollers will be very well guided when held pressed against the flange.

The design of the form of the bearing according to Figure 1 and the resultants of the forces acting upon a roller are shown in Figure 3, in both of which figures like numerals denote like parts. The spherical outer race 2 has a radius R with its centre at 13. According to this form of the invention, R will also be the radius of the profile of the roller. After having drawn the line 14 passing through the greatest diameter $d$ of the roller, the centre 15 for the other contour line of the roller will be located on the line 14 at a distance 2R—d from the centre 13. After having fixed the contact point 16 between the roller and the inner race 4, a point 17 on the line 18 passing through the points 15 and 16 is chosen as centre for the arc, which forms the profile of the inner race 4. The radius of this arc should be greater than R. The resultant B will, therefore, engage the roller at the point 16 and will be directed along the line 18. The resultant C of the forces acting upon the roller from the flange 6 will be directed toward the centre of the sphere 9. The force C will, therefore, be directed along the line 19, which passes through the point of intersection of the bearing axis and the roller axes. The lines 18 and 19 intersect at 20. The condition for equilibrium is that the lines of force of all resultants acting upon the roller pass through a common point. It follows therefore that the line of force of the resultant A must also pass through the point 20. The line of force also passes through the centre 13 of the sphere. The resultant A will, therefore, act along the line 21 and is applied to the roller at 22. It is apparent that the resultants A and B will have a resultant directed toward the flange 6. This latter resultant is compensated by the force C. The relative magnitudes of the forces A, B and C can be arrived at by drawing a diagram of forces in the usual manner. The distribution of the forces is illustrated in Figure 4, in which a somewhat extended point contact is shown. This corresponds to the actual conditions in a bearing since, due to the deformation of the material because of its elasticity, a theoretical point contact will not exist under load.

Figure 5:
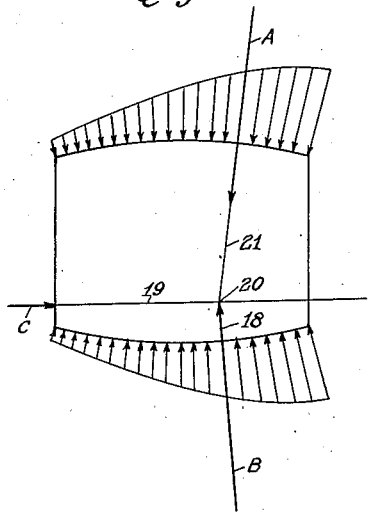
Figure 6:
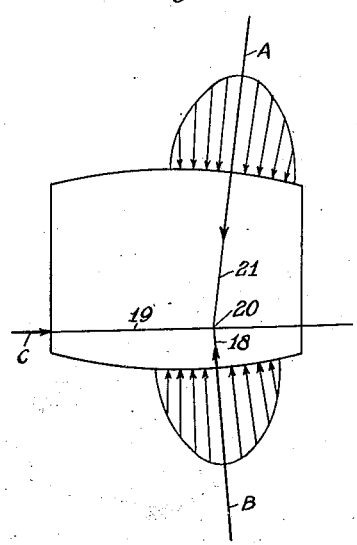
Figure 7:
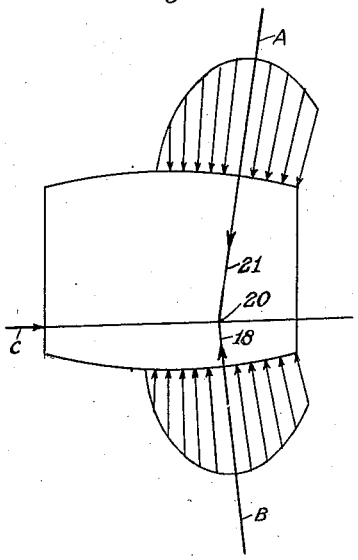

It is apparent that the bearing can be altered, so that the roller makes a line contact with the inner race and a point contact with the outer race. The directions and points of application of the resultants can be found by means of a diagram similar to that of Figure 3. The distribution of forces will be as shown in Figure 4. The roller can also make contact with both races along lines. In such a case the radius of curvature of the profiles of the roller and the inner and outer races would be equal, but the centre of curvature of one of the profiles would be somewhat displaced, so that the centre for the roller and that of the race do not coincide. The distribution of the forces will then be as shown in Figure 5. It is also possible to have point contact between the roller and both races, in which case the distribution of forces will be that shown in Figures 6 and 7.

It is apparent that the invention is not confined to the forms shown. The races may, for instance, be so made and disposed that the rollers are brought into engagement with the outer flanges, in which case the middle flange may be dispensed with if desired. The profiles of the rollers and the non-spherical race ring may have other than spherical form, for instance elliptical. The flange and the ends of the rollers may be given other forms, so that a surface or point contact will occur, for instance, the roller end can be made spherical and the side face of the flange conical. The bearing can be made with one row of rollers or with more than two rows. The point 16 can be so located, that the tangents to the roller at the points of application of the resultants A and B intersect near the point of intersection of the axis of the bearing with the axes of rollers.

Having thus described my invention, what I claim and desire to secure by Letters Patent is:

1. In a roller bearing the combination with a ring formed with a spherical race and a ring formed with a non-spherical race, of a set of symmetrical barrel shaped rollers disposed between the rings, the center of curvature of at least one of the said races being located at one side of the plane of symmetry of the roller whereby the resultants of the forces acting between the roller and such race is applied to the roller at one side of the greater diameter of the roller for pressing the roller toward the other side.

2. A roller bearing according to claim 1, characterized in that the roller contacts with one of the races at a point and with the other race along a line.

3. A roller bearing according to claim 1, in which the roller makes point contact with the inner race and line contact with the outer race.

4. A self-adjusting roller bearing comprising inner and outer race rings, one of which is formed with a spherically curved race and the other with a cooperating race and a roller guiding flange, and symmetrical rollers tracking on said races and formed with bearing surfaces curved axially, the curves of the races being such in relation to the axial curvatures of the rollers that the resultants of the pressures on the rollers at the outer and inner races will form an angle with each other and give a resulting force acting substantially in the direction of the axis of the rollers and toward the guiding flange; whereby the rollers will be pressed against the flange and guided thereby.

5. A roller bearing according to claim 4, in which the end surfaces of the rollers are substantially plane and the side face of the flange substantially spherical, whereby the rollers engage the flange along an arc of a circle at or near the edge of the end surface of the roller.

OLOV WOOD ÅHMANSSON.